(12) United States Patent
Li et al.

(10) Patent No.: US 11,460,124 B2
(45) Date of Patent: Oct. 4, 2022

(54) EJECTOR AND REFRIGERATING SYSTEM

(71) Applicant: Carrier Corporation, Palm Beach Gardens, FL (US)

(72) Inventors: Sheng Li, Shanghai (CN); Xinyu Wu, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 115 days.

(21) Appl. No.: 16/814,297

(22) Filed: Mar. 10, 2020

(65) Prior Publication Data
US 2020/0292099 A1    Sep. 17, 2020

(30) Foreign Application Priority Data

Mar. 15, 2019   (CN) .......................... 201910198165.7

(51) Int. Cl.
*F16K 31/165*      (2006.01)
*F25B 9/08*        (2006.01)
(Continued)

(52) U.S. Cl.
CPC .......... *F16K 31/165* (2013.01); *F16K 17/025* (2013.01); *F25B 9/08* (2013.01); *F25B 41/00* (2013.01); *F25B 2341/0013* (2013.01)

(58) Field of Classification Search
CPC ........ F16K 17/025; F16K 31/165; F25B 9/08; F25B 41/00; F25B 2341/0013;
(Continued)

(56) References Cited

U.S. PATENT DOCUMENTS

| 6,782,713 B2* | 8/2004 | Takeuchi | ............... | F25B 41/00 |
| | | | | 62/191 |
| 6,910,343 B2* | 6/2005 | Ozaki | ..................... | F25B 9/008 |
| | | | | 417/191 |

(Continued)

FOREIGN PATENT DOCUMENTS

| CN | 103003643 B | 12/2015 |
| JP | 2003074992 A | 3/2003 |
| JP | 2003279177 A | 10/2003 |

OTHER PUBLICATIONS

European Search Report for Application No1 20162513.4; dated Jul. 15, 2020; 6 Pages.

*Primary Examiner* — Frantz F Jules
*Assistant Examiner* — Martha Tadesse
(74) *Attorney, Agent, or Firm* — Cantor Colburn LLP

(57) ABSTRACT

An ejector and a refrigeration system. The ejector includes: a high-pressure fluid passage, a flow valve for controlling a flow rate in the high-pressure fluid passage; a suction fluid passage; a mixing chamber, which includes a mixed fluid outlet; a thermal bulb disposed upstream of the flow valve, in the high-pressure fluid passage or outside the high-pressure fluid passage; and an elastic diaphragm disposed in the high-pressure fluid passage, wherein a closed cavity is on a first side of the diaphragm, and the high-pressure fluid passage is on a second side of the diaphragm; the thermal bulb in communication with the closed cavity, and the thermal bulb and the closed cavity are filled with fluid; and the diaphragm is associated with the flow valve so that an opening degree of the flow valve varies in response to a change in a pressure difference across two sides of the diaphragm.

10 Claims, 1 Drawing Sheet

(51) Int. Cl.
*F16K 17/02* (2006.01)
*F25B 41/00* (2021.01)

(58) Field of Classification Search
CPC ...... F25B 2341/0683; F25B 2341/0012; F25B 2341/0011; F25B 2341/0015; F25B 2400/23; F04F 5/52; F04F 5/16; F04F 5/461; F04F 5/54; F04F 5/46; B60H 2001/3298
See application file for complete search history.

(56) References Cited

U.S. PATENT DOCUMENTS

| | | | | |
|---|---|---|---|---|
| 7,178,359 B2* | 2/2007 | Oshitani | .................... | F25B 5/00 62/500 |
| 7,823,400 B2* | 11/2010 | Oshitani | .................... | F25B 41/00 62/191 |
| 7,841,193 B2* | 11/2010 | Nishida | .................... | F25B 41/00 62/170 |
| 2004/0007014 A1* | 1/2004 | Takeuchi | .................... | F25B 41/00 62/500 |
| 2004/0011065 A1* | 1/2004 | Takeuchi | .................... | F25B 41/00 62/170 |
| 2004/0103685 A1* | 6/2004 | Yamaguchi | .................... | F25B 41/24 62/196.4 |
| 2004/0172966 A1* | 9/2004 | Ozaki | .................... | F25B 9/008 62/500 |
| 2004/0211199 A1* | 10/2004 | Ozaki | .................... | F25B 41/00 62/170 |
| 2004/0255611 A1* | 12/2004 | Nishijima | .................... | F25B 41/00 62/500 |
| 2004/0255612 A1* | 12/2004 | Nishijima | .................... | F25B 41/00 62/500 |
| 2004/0261448 A1* | 12/2004 | Nishijima | .................... | F25B 41/00 62/500 |
| 2008/0011363 A1* | 1/2008 | Ohta | .................... | F25B 41/335 137/535 |
| 2009/0013704 A1* | 1/2009 | Oshitani | .................... | F25B 41/00 62/191 |
| 2017/0159977 A1* | 6/2017 | Hellmann | .................... | F25B 41/20 |
| 2018/0066872 A1* | 3/2018 | Hellmann | .................... | F25B 41/00 |
| 2018/0119997 A1* | 5/2018 | Siegert | .................... | F25B 1/10 |
| 2019/0353413 A1* | 11/2019 | Larsen | .................... | F25B 49/02 |
| 2020/0292219 A1* | 9/2020 | Li | .................... | F04F 5/04 |

* cited by examiner

EJECTOR AND REFRIGERATING SYSTEM

FOREIGN PRIORITY

This application claims priority to Chinese Patent Application No. 201910198165.7, filed Mar. 15, 2019, and all the benefits accruing therefrom under 35 U.S.C. § 119, the contents of which in its entirety are herein incorporated by reference.

FIELD OF THE INVENTION

The present disclosure relates to a refrigeration system, and more particularly, the present disclosure relates to an ejector, and a refrigeration system with an ejector.

BACKGROUND OF THE INVENTION

In commercial refrigeration systems, especially systems that require a large pressure differential, an ejector is used to improve efficiency. The ejector typically pressurizes a suction fluid by means of a high-pressure fluid and supplies mixed fluids to a compressor inlet, thereby increasing the pressure of fluid at the compressor inlet, reducing the requirements on the capacity of the compressor and improving the efficiency of the system. During the operation of the ejector, the pressure of a high-pressure fluid in a high-pressure fluid passage needs to be adjusted based on the temperature to optimize the system efficiency. In the related art, an electronic control system is usually used to control a stepper motor based on the temperature and pressure of the high-pressure fluid, thereby controlling an opening degree of a flow valve in the high-pressure fluid passage in order to achieve the optimal pressure at the current temperature. On the other hand, the system load is adjusted while maintaining the pressure.

A trans-critical refrigeration system refers to a refrigeration cycle system in which refrigerants in both subcritical and supercritical states exist. A supercritical state refers to a state where the pressure and temperature of a fluid exceed its critical pressure and critical temperature, respectively. Common trans-critical refrigeration systems for example include a system in which carbon dioxide is used as a refrigerant.

SUMMARY OF THE INVENTION

An object of the present disclosure is to solve or at least alleviate the problems existing in the related art.

In one aspect, an ejector for use in a refrigeration system is provided, which includes: a high-pressure fluid passage extending from a high-pressure fluid inlet to a mixing chamber, a flow valve for controlling a flow rate being disposed in the high-pressure fluid passage; a suction fluid passage extending from a suction fluid inlet to the mixing chamber; the mixing chamber, which includes a mixed fluid outlet; a thermal bulb disposed upstream of the flow valve, in the high-pressure fluid passage or outside the high-pressure fluid passage; and an elastic diaphragm disposed in the high-pressure fluid passage, wherein a closed cavity is on a first side of the elastic diaphragm, and the high-pressure fluid passage is on a second side of the elastic diaphragm; the thermal bulb is in communication with the closed cavity, and the thermal bulb and the closed cavity are filled with fluid; and the elastic diaphragm is associated with the flow valve so that an opening degree of the flow valve varies in response to a change in a pressure difference across two sides of the elastic diaphragm.

Optionally, in the ejector, the flow valve and the elastic diaphragm are mechanically connected.

Optionally, in the ejector, the high-pressure fluid passage includes a high-pressure fluid nozzle, the high-pressure fluid nozzle includes a constricted section, a throat portion, and a diffusion section in sequence, and the flow valve is a needle valve at the throat portion of the high-pressure fluid nozzle.

Optionally, in the ejector, a rear end of the needle valve is connected to the elastic diaphragm.

Optionally, in the ejector, the high-pressure fluid passage is further provided with a support member, and an elastic member connected between the support member and the needle valve.

Optionally, in the ejector, a position of the support member is adjustable.

Optionally, in the ejector, the suction fluid passage includes a suction chamber surrounding the high-pressure fluid nozzle.

Optionally, in the ejector, a fluid in the closed cavity is completely or partially composed of a saturated refrigerant having substantially the same composition as the fluid in the high-pressure fluid passage.

Optionally, in the ejector, a fluid in the closed cavity includes a first component having substantially the same composition as the fluid in the high-pressure fluid passage, and a second component different from the first component, and the second component functions when the first component is in a supercritical state.

Optionally, in the ejector, the mixing chamber includes a constricted section, a neck section and a diffusion section in sequence.

In another aspect, a refrigeration system is provided, which includes the ejector according to various embodiments of the present disclosure.

Optionally, the refrigeration system includes a single ejector or a plurality of ejectors connected in parallel.

Optionally, in the refrigeration system, the high-pressure fluid inlet of the ejector is connected to an outlet of a compressor via an optional regenerator, and a heat exchanger, the suction fluid inlet of the ejector is connected to an evaporator, and an outlet of the ejector is connected to a separator.

Optionally, the refrigeration system includes: a medium-temperature compressor, an outlet of which is connected to the high-pressure fluid inlet of the ejector via the heat exchanger and the optional regenerator; and a gas-liquid separator, wherein the mixed fluid outlet of the ejector is connected to the gas-liquid separator, a gas-phase outlet of the gas-liquid separator is connected to an inlet of the medium-temperature compressor, and a liquid-phase outlet of the gas-liquid separator is connected to the suction fluid inlet of the ejector via a medium-temperature expansion valve and a medium-temperature evaporator.

Optionally, in the refrigeration system, the liquid-phase outlet of the gas-liquid separator is further connected to an inlet of a low-temperature compressor via a low-temperature expansion valve and a low-temperature evaporator, and an outlet of the low-temperature compressor is connected to the inlet of the medium-temperature compressor.

BRIEF DESCRIPTION OF THE DRAWINGS

The contents of the present disclosure will become easier to understand with reference to the accompanying drawings. It can be easily understood by those skilled in the art that the drawings are merely used for illustration, and are not intended to limit the scope of protection of the present disclosure. In addition, like parts are denoted by like numerals in the drawings, wherein.

DETAILED DESCRIPTION OF THE EMBODIMENT(S) OF THE INVENTION

It will be readily understood that, based on the technical solutions of the present disclosure, those skilled in the art can propose various alternative structural forms and implementations without departing from the true spirit of the present disclosure. Therefore, the following specific embodiments and the accompanying drawings are merely exemplary description of the technical solutions of the present disclosure, which shall not be deemed as the entirety of the present disclosure or as limiting or restricting the technical solutions of the present disclosure.

Such orientation terms as "upper", "lower", "left", "right", "front", "rear", "front side", "back side", "top", "bottom" or the like that are mentioned or may be mentioned in this description are defined with respect to the configurations shown in the individual drawings. They are relative concepts and thus possibly vary according to their different locations or different states of use. Therefore, these or other orientation terms shall not be interpreted as limiting terms.

Figure 1:
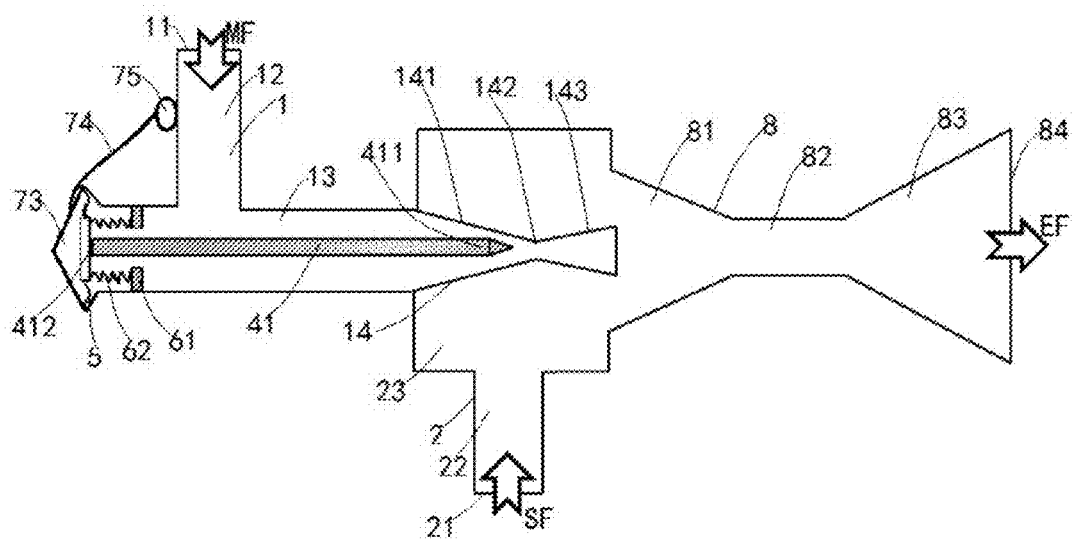
FIG. 1 is a schematic structural view of an ejector according to an embodiment of the present disclosure.

Referring first to FIG. 1, an internal structure of an ejector according to an embodiment of the present disclosure is shown. The ejector according to the embodiment of the present disclosure includes: a high-pressure fluid passage 1 extending from a high-pressure fluid inlet 11 to a mixing chamber 8, a flow valve for controlling a flow rate being disposed in the high-pressure fluid passage 1; a thermal bulb 75 disposed upstream of the flow valve, in the high-pressure fluid passage or outside the high-pressure fluid passage; a suction fluid passage 2 extending from a suction fluid inlet 21 to the mixing chamber 8; and the mixing chamber 8, which includes a mixed fluid outlet 84; wherein an elastic diaphragm 5 is disposed in the high-pressure fluid passage 1, a closed cavity 73 is on a first side of the elastic diaphragm 5, and the high-pressure fluid passage is on a second side of the elastic diaphragm 5; the thermal bulb 75 is in communication with the closed cavity 73, and the thermal bulb 75 and the closed cavity 73 are filled with fluid; and the elastic diaphragm 5 is associated with the flow valve so that an opening degree of the flow valve varies in response to a change in a pressure difference across two sides of the elastic diaphragm 5. Different from the existing common electronic control based on temperature and pressure sensors implemented by a stepper motor, according to the embodiment of the present disclosure, a mechanical control of an opening degree of the flow valve of the high-pressure fluid passage in the ejector is realized.

The high-pressure fluid passage 1 is configured to receive a high-pressure fluid MF having a higher pressure, such as a 90 bar refrigerant fluid, from an outlet of a compressor for example. The fluid MF will be accelerated when passing through the high-pressure fluid passage, whereby a fluid at the suction fluid inlet is suctioned and mixed with the high-pressure fluid MF. In the illustrated embodiment, the high-pressure fluid passage 1 may include a high-pressure fluid inlet 11, a first section 12, a second section 13, and a high-pressure fluid nozzle 14 in sequence. In some embodiments, the second section 13 may be perpendicular to the first section 12. In the illustrated embodiment, the elastic diaphragm 5 is disposed in the second section 13 of the high-pressure fluid passage 1 at an end opposite to the nozzle 14. The closed cavity 73 is on one side of the elastic diaphragm 5, and the high-pressure fluid passage is on the other side of the elastic diaphragm 5. In other words, the high-pressure fluid passage 1 is partitioned by the elastic diaphragm 5 so that the closed cavity 73 is formed. In some embodiments, the high-pressure fluid nozzle 14 may include a constricted section 141 having a gradually decreasing cross-sectional area, a throat portion 142 having a minimum cross-sectional area, and a diffusion section 143 having a gradually increasing cross-sectional area. In some embodiments, the flow valve is a needle valve 41 located near the throat portion of the high-pressure fluid nozzle. The needle valve 41 includes a first end or front end 411 and a second end or rear end 412. In some embodiments, the second end or rear end 412 of the needle valve 41 may be connected to the elastic diaphragm 5 so that the first end 41 thereof may approach or move away from the throat portion 142 of the nozzle in response to the movement of the elastic diaphragm 5, thereby controlling a flow rate of gas passing through the throat portion 142 of the nozzle 14 so that the needle valve 41 acts as a flow valve. In an alternative embodiment, the high-pressure fluid passage 1 may have any other suitable structure and/or other forms of flow valves may be disposed in the high-pressure fluid passage. In an alternative embodiment, the flow valve may be mechanically connected to the elastic diaphragm by any other suitable means so that the opening degree of the flow valve is adjusted in response to a change in a pressure difference across two sides of the elastic diaphragm 5. The high-pressure fluid is accelerated after passing through the nozzle, for example to a supersonic speed.

In some embodiments, a support member 61 and an elastic member 62 connected between the support member 61 and the needle valve 41 are further disposed in the high-pressure fluid passage. The elastic member 62 may be configured to give a certain pre-compression or pre-tension force to the needle valve 41 for returning the needle valve 41 or for compensating a friction force received during the movement of the needle valve 41. A magnitude of the pre-compression or pre-tension force may be set by selecting an appropriate elastic member 62. In some embodiments, a position of the support member 61 may be adjusted (e.g., adjusted in the left-right direction in the figure) to set an initial position of the needle valve 41. Although not shown in the figure, a guide member for guiding the movement of the needle valve 41 may be further disposed in the high-pressure fluid passage, such as an annular member fixed to a side wall of the high-pressure fluid passage and sleeved over a middle portion of the needle valve 41.

The suction fluid passage 2 is configured to receive a suction fluid SF having a lower pressure, such as 30 bar, from an outlet of an evaporator for example. In some embodiments, the suction fluid passage 2 may include a suction fluid inlet 21, a first section 22 and a suction chamber 23. In the illustrated embodiment, the suction chamber 23 surrounds the high-pressure fluid nozzle 14. In an alternative embodiment, the suction fluid passage 2 may have any suitable structure. In some embodiments, the high-pressure fluid MF and the suction fluid SF are mixed after entering the mixing chamber 8, and the mixing chamber 8 may, for example, include a constricted section 81 having a gradually decreasing cross-sectional area, a neck section 82 having a substantially constant cross-sectional area, a diffusion section 83 having a gradually increasing cross-sectional area and an outlet 84 of mixed fluids in sequence. In an alternative embodiment, the mixing chamber 8 may have other layouts. The mixed fluids EF exiting from the mixed fluid outlet 84 may have a higher pressure (such as 35 bar) than the suction fluid SF. The mixed fluids EF may be provided to the inlet of the compressor, thereby supplying a fluid having a higher pressure to the compressor, and reducing the requirements on the capacity of the compressor.

In some embodiments, the thermal bulb 75 is disposed outside the first section 12 of the suction fluid passage 1, and the thermal bulb 75 is in communication with the closed cavity 73 through a conduit 74. Appropriate heat insulation protection may be applied to the thermal bulb 75, the conduit 74 and the closed cavity 73. In other embodiments, the thermal bulb 75 may be disposed in or outside the high-pressure fluid passage between the high-pressure fluid inlet 11 and the flow valve to sense the temperature of the high-pressure fluid. In a case where the thermal bulb 75 is positioned in the high-pressure fluid passage, the conduit 74 may also be arranged in the high-pressure fluid passage, such as along a side wall of the high-pressure fluid passage.

For a subcritical refrigeration system having an ejector, the ideal state is that at a certain temperature, the desired pressure of the high-pressure fluid MF may be equal to the pressure of the saturated refrigerant at the current temperature. However, in practical applications, it is considered that once the pressure of the high-pressure fluid MF is lower than the pressure of the saturated refrigerant at the current temperature, the system performance (efficiency and cooling capacity) may be greatly deteriorated. Therefore, in general, the desired pressure of the high-pressure fluid MF may be set to be slightly higher (for example, 5%-10% higher) than the pressure of the saturated refrigerant at the current temperature to provide a safety margin. In addition, a pre-tension force may be provided by disposing the elastic member 62 in order to balance the pressure difference between the high-pressure fluid MF and the saturated refrigerant in the closed cavity 73. In some embodiments, the fluid in the closed cavity 73 may be entirely composed of a saturated refrigerant having the same composition as the fluid in the high-pressure fluid passage 1. In this case, when the pressure of the high-pressure fluid MF is lower than the desired pressure, the elastic diaphragm 5 and the needle valve 41 will move to the right, and the opening degree of the flow valve will decrease, thereby increasing the pressure of the high-pressure fluid MF; and when the pressure of the high-pressure fluid MF is higher than the desired pressure, the pressure of the fluid in the closed cavity 73 is lower than that of the high-pressure fluid MF, the elastic diaphragm 5 and the needle valve 41 will move to the left, and the opening degree of the flow valve will increase, thereby decreasing the pressure of the high-pressure fluid MF. Through the above process, the pressure of the high-pressure fluid MF in the high-pressure fluid passage will tend to approach the desired pressure at the current temperature. In some embodiments, the fluid in the closed cavity 73 may be partially composed of the refrigerant in the high-pressure fluid passage 1; for example, 90% (mass percentage) or more, 85% or more, or 70% or more, of the fluid in the closed cavity 73 is composed of the refrigerant in the high-pressure fluid passage 1, and the remaining portion may be composed of an inert gas.

For a trans-critical refrigeration system having an ejector, such as when the refrigerant includes $CO_2$, the desired pressure of the high-pressure fluid MF also has a definite relationship with the current temperature. When the temperature of the high-pressure fluid MF exceeds the critical temperature, the desired pressure of the high-pressure fluid MF is higher than the critical pressure, and increases with the rise of the temperature of the high-pressure fluid. The refrigerant in the closed cavity 73 will be converted into a gaseous state, and meet the ideal gas state equation, wherein the pressure P, the temperature T and the volume V have the following relationship: $PV=mR_gT$, where m is the mass of the gas and $R_g$ is a constant (related to the gas composition). Therefore, if the temperature rises, the pressure also rises. The relationship between the two is approximately linear, and the slope is related to a fluid filling mass and the total volume of the closed cavity together with the conduit and the thermal bulb. This relationship is approximate to the relationship between the desired pressure (optimal-efficiency pressure) of the high-pressure fluid and its temperature in a supercritical state. Therefore, in some embodiments, the fluid in the closed cavity 73 may be completely composed of a fluid having the same composition as the fluid in the high-pressure fluid passage 1. In this case, the fluid in the closed cavity 73 is completely gaseous, and the pressure thereof increases as the temperature rises. The relationship between the two is determined by the filling mass of the fluid in the closed cavity 73 and the volumes of the closed cavity 73, the thermal bulb 75 and the conduit 74 in the designing process. By suitable design, the pressure of the closed cavity 73 at a certain temperature is close to the desired pressure of the high-pressure fluid MF at the current temperature. In such a case, since the opening degree of the flow valve varies in response to a change in the pressure difference across two sides of the elastic diaphragm 5, the pressure of the high-pressure fluid MF in the high-pressure fluid passage will tend to approach the desired pressure at the current temperature. In some embodiments, the fluid in the closed cavity 73 may be partially composed of the refrigerant in the high-pressure fluid passage 1; for example, 90% (mass percentage) or more, 85% or more, or 70% or more, of the fluid in the closed cavity 73 is composed of the refrigerant in the high-pressure fluid passage 1, and the remaining portion may be composed of an inert gas. By adjusting the mass percentage of the inert gas, the constant $R_g$ in the relationship of the equation $PV=mR_gT$ can be adjusted in order to adjust the properties of the gas in the closed cavity to be closer to the desired state.

Figure 2:
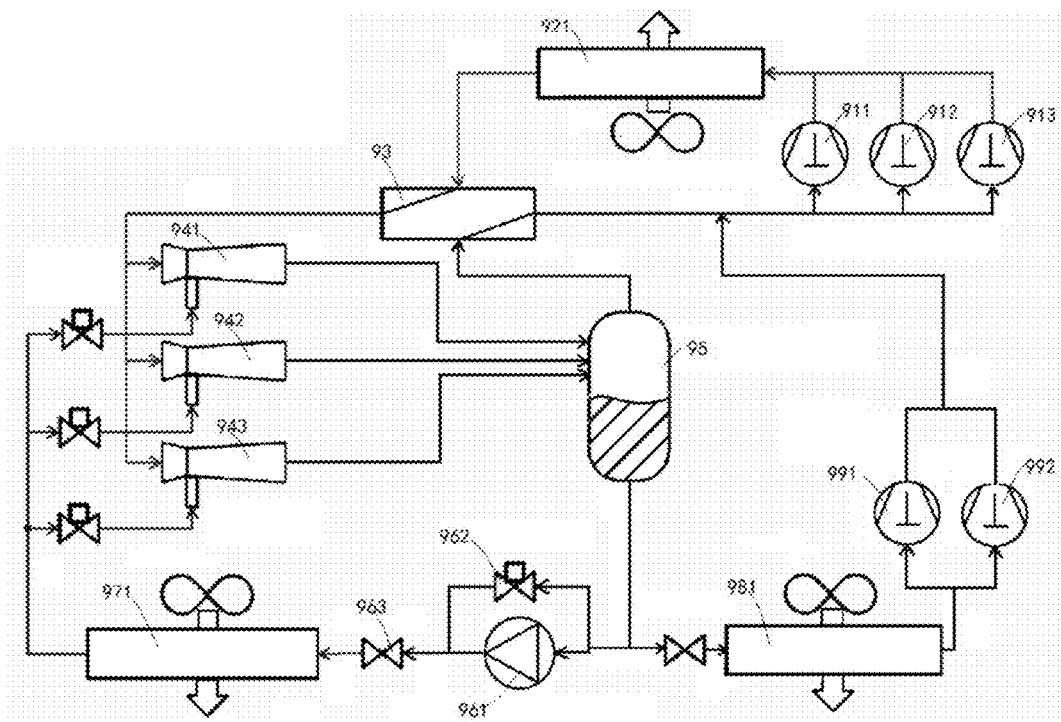
FIG. 2 is a schematic structural view of a refrigeration system to which the ejector according to an embodiment of the present disclosure is applied.

The present disclosure also provides a refrigeration system including the ejector according to various embodiments of the present disclosure. With continued reference to FIG. 2, a refrigeration system to which an embodiment of the present disclosure is applied will be described; for example, a commercial refrigerating cabinet is taken as an example. In some embodiments, the refrigeration system may include a plurality of ejectors 941,942 and 943 connected in parallel, and in an alternative embodiment, only one ejector may be provided. The high-pressure fluid inlet of each ejector is connected to outlets of compressors 911, 912 and 913, and a heat exchanger 921 and an optional regenerator 93 may be disposed therebetween. The heat exchanger 921 may be for example a condenser or an air cooler. In this embodiment, the compressors 911,912 and 913 may be medium-temperature compressors. The medium-temperature compressors 911,912 and 913 are connected to the high-pressure fluid inlets of each ejector 941,942 and 943 via the heat exchanger 921 and the optional regenerator 93. In the regenerator 93, the fluid can exchange heat with a gas-phase fluid of a separator. In addition, the mixed fluid outlet of each ejector 941,942 and 943 is in communication with a separator 95. The gas phase of the separator 95 leads to the inlets of the medium-temperature compressors 911,912 and 913 through the optional regenerator 93, and the liquid phase of the separator enters an evaporator 971 through an optional booster pump 961 or a bypass passage 962 and a medium-temperature expansion valve 963, and then enters the suction fluid inlet of each ejector 941,942 and 943. In addition, in a optional embodiment, a portion of the liquid-phase fluid of the gas-liquid separator may also flow to inlets of low-temperature compressors 991 and 992 through a low-temperature expansion valve and a low-temperature evaporator 981, and outlets of the low-temperature compressors are connected to the inlets of the medium-temperature compressor 911,912 and 913. In an alternative embodiment, the ejector according to various embodiments may also be applied to other types of refrigeration devices.

According to a preferred embodiment of the present disclosure: 1) there is no electrical control and stepper motor, the cost is saved and the system stability is improved; 2) the mechanical control has an adaptive characteristic, and a manual adjustment is eliminated; and 3) the control of the pressure and refrigerant flow is automatically realized.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. Therefore, it should be understood that these modifications or changes should be included within the scope of protection of the present disclosure.

What is claimed is:

1. An ejector for use in a refrigeration system, comprising: a mixing chamber comprising a mixed fluid outlet; a high-pressure fluid passage extending from a high-pressure fluid inlet to the mixing chamber, a flow valve for controlling a flow rate being disposed in the high-pressure fluid passage; a suction fluid passage extending from a suction fluid inlet to the mixing chamber; a thermal bulb disposed upstream of the flow valve, in the high-pressure fluid passage or outside the high-pressure fluid passage; and an elastic diaphragm disposed in the high-pressure fluid passage, wherein a closed cavity is on a first side of the elastic diaphragm, and the high-pressure fluid passage is on a second side of the elastic diaphragm; the thermal bulb is in communication with the closed cavity, and the thermal bulb and the closed cavity are filled with fluid; and the elastic diaphragm is associated with the flow valve so that an opening degree of the flow valve varies in response to a change in a pressure difference across two sides of the elastic diaphragm; wherein the elastic diaphragm is associated with the flow valve such that when a pressure of the high-pressure fluid is lower than a desired pressure, the opening degree of the flow valve will decrease, thereby increasing the pressure of the high-pressure fluid; and when the pressure of the high-pressure fluid is higher than the desired pressure, a pressure of the fluid in the closed cavity is lower than that of the high-pressure fluid, and the opening degree of the flow valve will increase, thereby decreasing the pressure of the high-pressure fluid.

2. The ejector according to claim 1, wherein the flow valve is a needle valve at a throat portion of a high-pressure fluid nozzle, and a rear end of the needle valve is connected to the elastic diaphragm.

3. The ejector according to claim 2, wherein the high-pressure fluid passage comprises a high-pressure fluid nozzle, the high-pressure fluid nozzle comprises a constricted section, a throat portion, and a diffusion section in sequence, the suction fluid passage comprises a suction chamber surrounding the high-pressure fluid nozzle, and the mixing chamber comprises a constricted section, a neck section, and a diffusion section in sequence.

4. The ejector according to claim 1, wherein the high-pressure fluid passage is further provided with a support member, a position of which is adjustable, and an elastic member connected between the support member and the needle valve.

5. The ejector according to claim 1, wherein the fluid in the closed cavity is completely or partially composed of a saturated refrigerant having the same composition as the fluid in the high-pressure fluid passage.

6. The ejector according to claim 1, wherein the fluid in the closed cavity comprises a first component having the same composition as the fluid in the high-pressure fluid passage, and a second component different from the first component.

7. A refrigeration system, comprising the ejector according to claim 1.

8. The refrigeration system according to claim 7, wherein the refrigeration system comprises a single ejector or a plurality of ejectors connected in parallel.

9. The refrigeration system according to claim 7, comprising:
a medium-temperature compressor, an outlet of which is connected to the high-pressure fluid inlet of the ejector via a heat exchanger and an optional regenerator; and
a gas-liquid separator, wherein the mixed fluid outlet of the ejector is connected to the gas-liquid separator, a gas-phase outlet of the gas-liquid separator is connected to an inlet of the medium-temperature compressor, and a liquid-phase outlet of the gas-liquid separator is connected to the suction fluid inlet of the ejector via a medium-temperature expansion valve and a medium-temperature evaporator.

10. The refrigeration system according to claim 9, wherein the liquid-phase outlet of the gas-liquid separator is further connected to an inlet of a low-temperature compressor via a low-temperature expansion valve and a low-temperature evaporator, and an outlet of the low-temperature compressor is connected to the inlet of the medium-temperature compressor.

* * * * *